Dec. 13, 1955          A. A. LAHTI          2,726,593

HOT AIR PANEL AND CIRCULATORY HEATING SYSTEM

Filed Feb. 18, 1952          3 Sheets-Sheet 1

ANARD A. LAHTI
INVENTOR

BY Smith & Tuck
ATTORNEYS

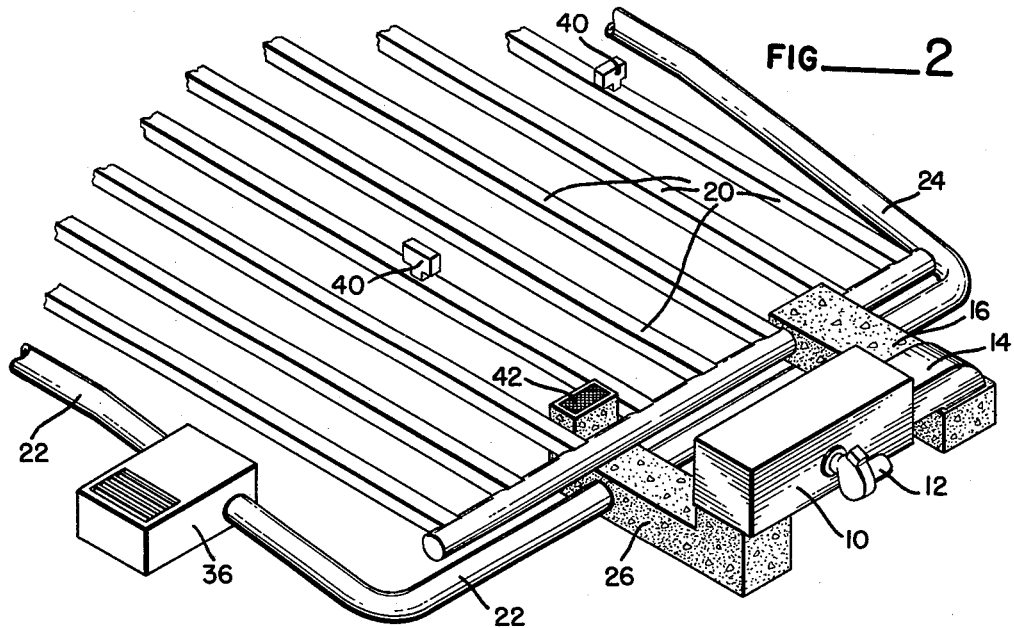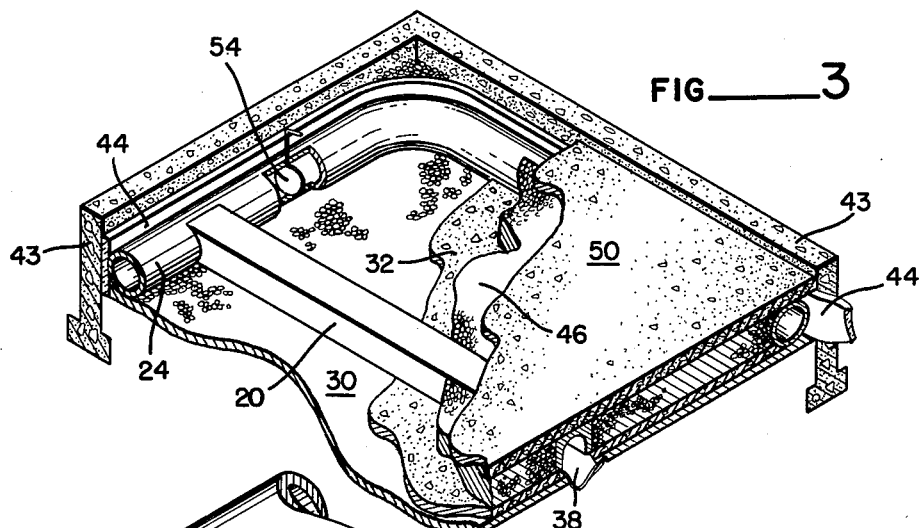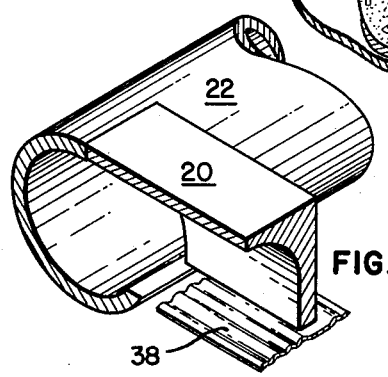

Dec. 13, 1955   A. A. LAHTI   2,726,593
HOT AIR PANEL AND CIRCULATORY HEATING SYSTEM
Filed Feb. 18, 1952   3 Sheets-Sheet 3
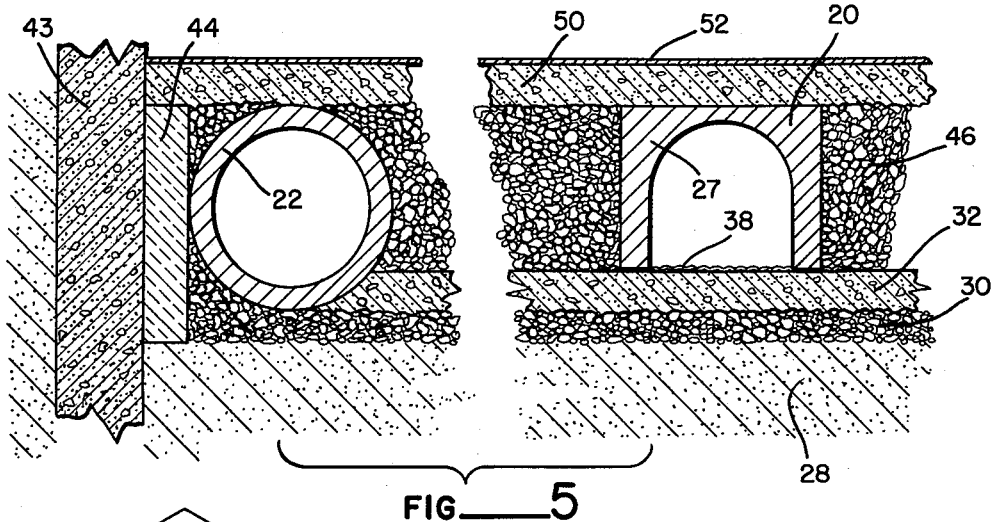
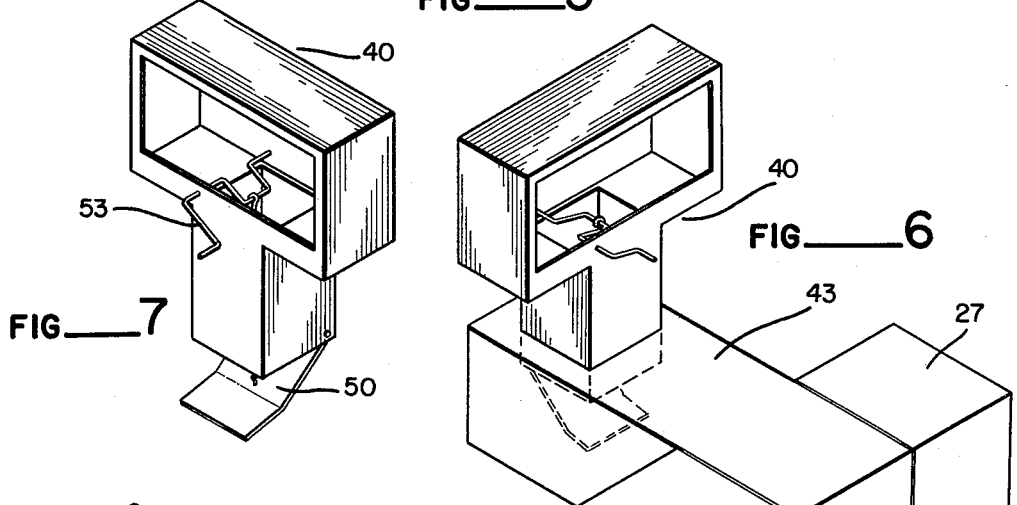
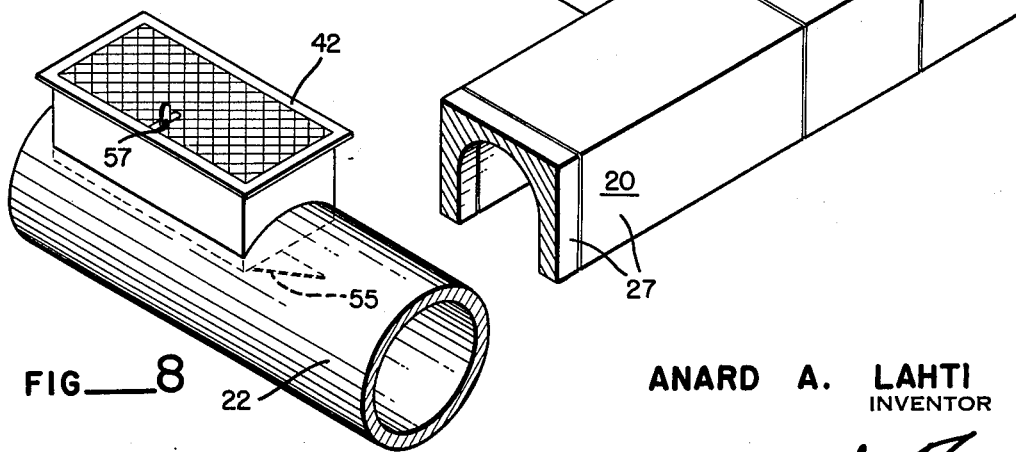
ANARD A. LAHTI
INVENTOR
BY Smith & Tuck
ATTORNEYS

United States Patent Office 2,726,593
Patented Dec. 13, 1955

2,726,593

HOT AIR PANEL AND CIRCULATORY HEATING SYSTEM

Anard A. Lahti, Auburn, Wash., assignor of fifty per cent to Forest Glen Ayers, South Tacoma, Wash.

Application February 18, 1952, Serial No. 272,021

3 Claims. (Cl. 98—33)

This present invention, which is a continuation in part of my co-pending application Serial No. 180,197, relates to a system using forced circulation of hot air by which the user can determine selectively whether to use radiant floor heating or forced hot air circulatory heating. This present plan makes it possible for a homeowner for instance to heat up his home quickly on the basis of circulating hot air and then, while the system is operating, gradually to heat up the floor slab, at which time the floor slab can take over the entire heating load, or a combination of radiant and circulating heating can be achieved. This achievement is optional in each of the various rooms of the home so that the form of heating can be selected for the patricular room which appears to be most desirable to the user of that room. It follows that the various rooms of the house could be heated by one or the other of the two systems or by any divisional combination of the two systems.

Ever since the earliest discovery of fire, man's ingenuity has been taxed in order to determine how to use this agency for his own personal comfort. Heating in general as we think of it for the heating of homes, places of business, and the like, may be divided roughly into two systems; one, radiant energy heating wherein a substance is heated and gives off radiant energy and this energy will travel from its generating source until it strikes some solid object or person, and at that time the radiant energy is converted into heat. This is briefly the manner in which the sun warms one exposed to its rays. One can be warmed in this manner even though the ambient temperature may be very low. Common examples of this form of heating in every day life are to be found in the open fireplace, even the open camp fire, and such heating devices as the electric spot light heaters, and the like. The more recent use of these principles is expressed in the panel heating arrangements, and more especially in the concrete floors which are heated by passing through the concrete mass hot water or steam, or in a few cases, of using electric heat cables. There are many proponents for and against this form of heating. However its increasing use shows that many persons place the warm floor and temperature stability of this plan above its disadvantages, the most common of which is the fact that the air in the room must be used over and over again by its inhabitants and in the case of smoke from smokers, cooking odors, and the like, which are not dissipated or removed in inhabitated places there may be actually gradually occurring a deficiency of oxygen in the remaining air, together with an over-abundance of carbon dioxide and other unwanted gases.

Probably the most prevalent form of heating used at this time is hot air which heats by convection. Here the heat is transferred through wiping air currents, either forced, or self-induced by a temperature differential. The simplest form of this type of heating is the ordinary stove where air is heated above the stove, caused to rise and to be replaced by colder air from a lower strata. In modern home planning, however, heating by hot air is normally done by inducing, mechanically, a circulation in the air. Such a system has the advantages of quickly being put into use so that in a manner of minutes the ambient air around individuals can be warmed to a point where they are in effect comfortable, even though the objects near them may still be cold. Such a sensation of course is produced actually on the surface of the body and does not give that deep penetrating warmth that is probably best experienced by standing in front of an open fire or in close proximity to a red-hot stove. Circulated hot air however has the advantage of providing fresh clean air because the air may be conveniently passed through an air-conditioning system where its temperature can be raised or lowered as desired. Filters can be interposed and electric participation of dust particles, pollen and the like can be achieved. The fact that it is in such general use indicates clearly its many advantages.

This present invention has as its principal purpose, the combination of these two systems of heating so that the user can make use of one or the other to meet the conditions of the moment, and will have available, benefit of using the two systems jointly so that the best features of both can be fully utilized. It cannot be maintained that either one of these plans separately is basically new. The applicant proposes to heat the floor of a home, preferably made of cementitious materials, by means of hot air. Such a plan was apparently in usage among certain of the early Romans as excavations in those areas showed so clearly. The excavations, however, indicate the hot products of combustion from low-placed fires were led through passageways in the floors and walls to achieve the radiant energy, or panel heat, as we might now term it. Such a plan is difficult to achieve economically and safely. Therefore the substitution of conditioned air as used by applicant appears much more satisfactory.

The conditioned air used to produce the desired temperature in the floor slab may then be introduced into the various living rooms whether they be in a home or in a place of business so that adequate ventilation is achieved by air that is fully conditioned, either having its temperature raised or lowered to the optimum level and filtered, or otherwise treated, as desired. This combined use has proved to be a most excellent method of heating, giving as it does all the advantages of panel heating and all the advantages of forced air heating with its quick response to heating demands. It enables persons stepping into, or awakening in a cold room, to very quickly have themselves surrounded by warm air to which the body is so quickly responsive. To make this form of heating a reality, requires careful planning and adequate balancing of the two quite different forms of heating. This technique and the means associated therewith to achieve a truly balanced combination of the virtues of the best in heating is submitted as applicant's contribution in this field.

The principal object of this present invention is to provide a workable combination of radiant heating and convectional heating.

A further object of this invention is to provide a radiant heating panel in which the heat is transferred to the mass of the panel by forced hot air being circulated therethrough.

A further object of this invention is to provide a forced circulation hot air heating system which is readily available for quick heating of enclosed areas.

A further object of this invention is the provision of means whereby a combination of panel heat and circulating hot air heat can be achieved and be under the immediate selective control of the user thereof.

Further objects, advantages and capabilities will be apparent from the description and disclosure in the drawings, or may be comprehended or are inherent in the device.

In the drawings:

Figure 2 is a perspective view showing this furnace end of Figure 1 and illustrating only the heating means and the cold and hot air conduits associated therewith;

Figure 3 is a perspective view, partly in section, partly broken away, illustrating a single corner of a floor slab made under the teachings of this present invention;

Figure 4 is a perspective view, in section, showing the juncture between the heating duct and either the cold air return or the air supply header;

Figure 5 is a vertical sectional view, broken away in part and bracketed, showing the typical construction of the air return and the heating air ducts;

Figure 6 is a fragmentary, perspective view, partly in section, showing the control means for admitting warm air into the enclosed areas of a building;

Figure 7 is a perspective view showing, in greater detail, the damper means illustrated in Figure 6;

Figure 8 is a perspective view of the construction showing the return air register in association with the cold air return pipe or duct.

Figure 1:
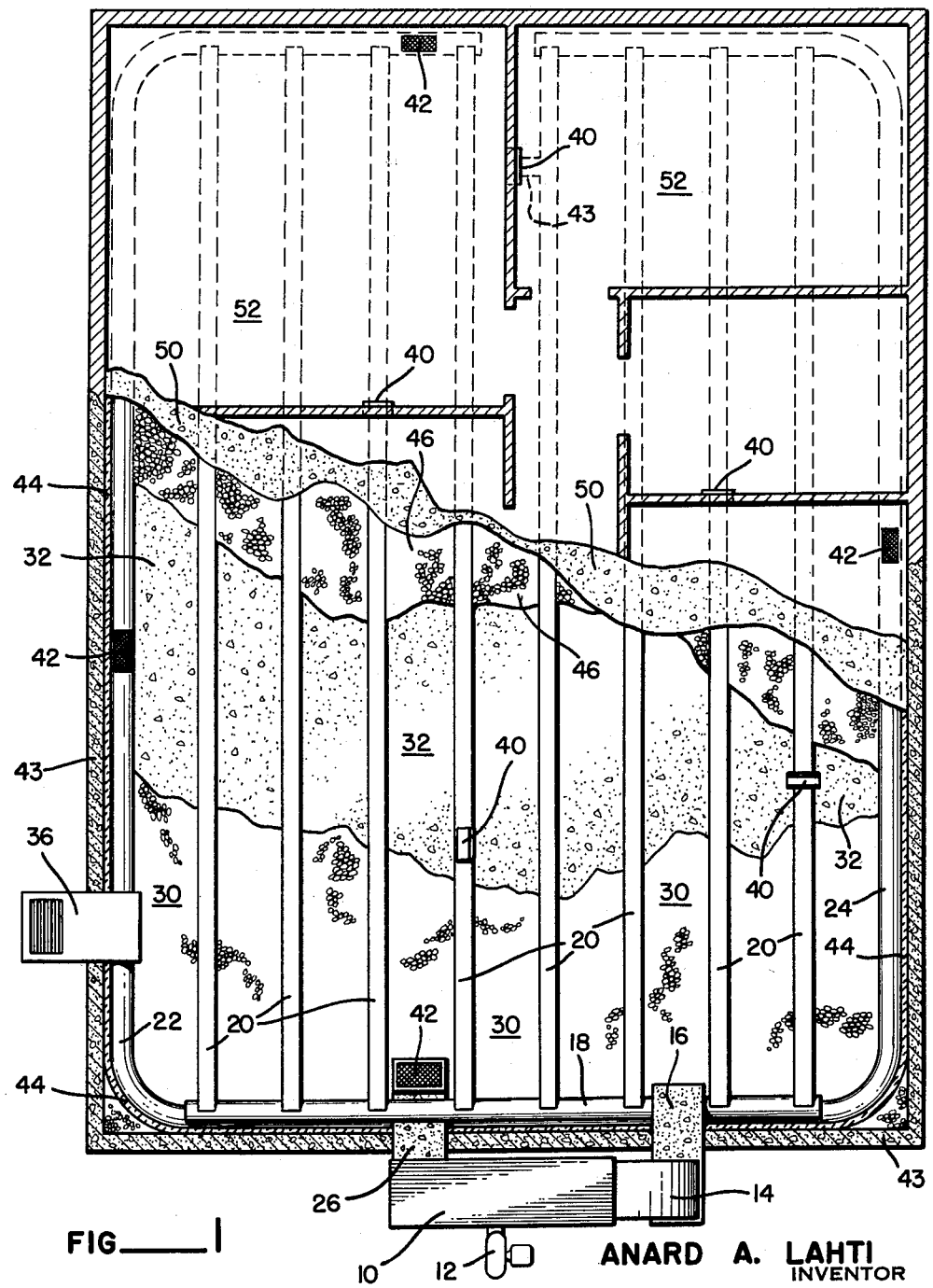
Figure 1 is a top plan view of the floor heating plan of a home, certain parts being shown in section, and others broken away to illustrate the structure more fully.

Referring more particularly to the disclosure in the drawings, the numeral 10 designates an air conditioning furnace. This may be any appropriate type, fired by any convenient heating means, as, for instance, the oil burner 12. Normally the minimum performance demanded of such a furnace is that it shall filter the air taken into it, heat the same, humidify it, and pass it out as through the heat duct 14 and the connecting concrete duct 16. In certain localities such a furnace can be provided with means for cooling air appropriate for use in warm climates, and also in the summer, and the various electronic devices for precipitating dust or purifying the air might be included. The conditioned air is discharged out of the concrete duct 16 into the concrete header 18 and from this header into a plurality of air supply ducts 20. These ducts preferably are positioned at spaced intervals and extend the length of the building to be heated. At their extremities they join into air return ducts as 22 and 24 which communicate with the concrete air return ducts 26 and are led back into the furnace.

The plan of Figure 1 is taken from a house under construction and some brief indication is made of the room arrangement so as to illustrate one arrangement of air supply registers for controlling the admission of conditoned air into the rooms, and also a plurality of air return registers. Particulars of these elements are shown in greater detail in the various views from Figures 2 through 8, inclusive.

A preferred arrangement of the floor of a house utilizing this heating plan is shown in Figure 5. The air supply ducts are preferably formed of a plurality of short lengths of concrete or clay tile of U-shaped pattern indicated at 27. Additionally the ground upon which the floor is to be built is graded level with the subgrade 28 either with the natural firm soil in place, or an impacted soil surface. Upon the subgrade is disposed a layer of reasonable thickness of pervious material such as gravel or the like indicated at 30. This provides drainage for under-floor areas and should be provided suitably with drains to carry off any moisture collected therein. On top of the gravel layer 30 is poured a concrete slab 32. This can be of any required thickness although normally a relatively thin slab in the neighborhood of a couple of inches thick is found to be satisfactory. Usually at the time this slab is poured the air return ducts 22 and 24 are put in place together with the air supply duct 16, the air return duct 26 and preferably an outside connection as 36 so that outside air can be taken into the system as desired. Ducts 22 and 24 are shown as continuous pipes although normally they are formed of sections for ease of handling. When slab 32 has set sufficiently, the air supply ducts 20 are put in place. First a metal reflective surface material is laid as 38 and then the various tiles 27 put in place to form the continuous ducts 20.

Each of the air supply ducts 20 is joined to the distributing header 18 and to the air return duct 22 or 24 after the showing of Figures 3 and 4. Provision is further made for the installation of the scoop type air supply registers 40 and the cold air, or return air registers, 42. In some instances it may be necessary to have an offset arrangement after the showing of Figure 6, having the connection portion 43, in order that the register can be properly positioned where the walls will later be installed. Insulation and waterproofing strips 44 are normally disposed entirely around the inside of the foundation walls. When the various conduits have all been checked for position and proper provision made for entrance to them, the whole surface is then filled with a gravel fill, preferably as 46, and when the surface has been struck flush with the top of the various conduits, a concrete top slab 50 is poured in place. This seals in the entire system of ducts and actually provides the heat radiating member controlling heating or the heat absorbing member in a cooling system. Any desired type of finish floor surfacing at 52 may then be applied.

This method of installing the ducts is deemed to be an improvement over the conventional method of installation. In common practice a filler of gravel is placed directly on the subgrade and then a concrete slab is poured on the gravel bed. The conduits are positioned in the gravel, the slab or partially in both. The slab in this common arrangement has to be of considerable thickness in order to have adequate strength when supported only by the gravel resting on the subgrade. In order to meet the requirement of strength, there must be a greater thickness of the slab above the conduit than provided in my system with a consequent loss of heating efficiency. At the same time, the conduit thus positioned in common practice loses a substantial amount of heat through conduction downward into the ground; thereas my ducts are protected by a layer of radiating material and a concrete slab therebelow. Slab 32 is reasonably stable and, the gravel fill 46 being incompressible, slab 50 may be relatively thin for high heating efficiency because of the firmness of its support and heats up quicker than the thicker slabs used in the conventional installations. Slab 50 is described herein as "thin," and this is defined for purposes of the specification and claims as from one and a quarter to two inches in thickness.

The hot air registers 40 are shown as connecting with the hot air ducts 20 intermediate the ends thereof. This is very important if the system is to be adjusted to obtain the maximum heating from the heated air passing from furnace 10. Furnace 10 is preferably placed close to the living rooms and removed from the bed rooms so that maximum heating will be in the areas where highest temperatures are desired. An efficient system should be so constructed and adjusted that the air stream passing through ducts 20 will have lost the most of its heat content by the time it reaches the air return ducts 22, 24. If the air were taken off at the ends of ducts 20 or from the air return ducts 22, 24, the air would be too cool to heat the room satisfactorily in passing therethrough and would be uncomfortable to the occupants. Therefore, the registers should connect to the hot air ducts 20 intermediate their ends in a manner so that hot air of acceptable temperature will be circulated when the registers 40 are opened.

Another convenient adjustment of this system is in the case a number of guests visiting for the evening or the like. A number of persons in a roof give out considerable heat; and, if the room were to be heated by radiant floor heating, it would soon become too hot and the floor could not be cooled quickly enough for comfort. At the same time, air circulation for removal of smoke, supply of fresh air, etc., would be desirable. The proper procedure would be to open the hot air registers before the guests arrived so that the floor would be relatively cool and to use air circulation for the rest of the evening, cutting down on the heat of the air when necessary and having a changing of air in the rooms. This adjustment is not possible with ordinary radiant heating and illustrates the adaptability of my system.

When an installation of this order is being made, it is necessary to give full consideration to the types of heating required and particularly as relates to the air circulation requirements. Normally the air supply registers 40 are arranged with an adjustable damper or scoop member 50, controllable by a handle and crank arrangement 53 disposed above the floor level. This then provides that the user of the system can control the admission of air into the room from any of the registers. It is also possible to employ scoop member 50 as a damper to close off any of the air supply ducts 20. However a more preferred or additional method is to employ dampers such as illustrated in Figure 3 at 54. By proper placements and an adequate number of these dampers fullest control can be given to the system either on the basis that the dampers will be set at the time of occupancy of the building and then left in that position to insure the desired flow of heat or they may be of the type under control of the occupant so that he may have greater flexibility in the controlling of his heating system. Attention is further invited to Figure 8 in which it is noted that the cold air return registers 42 are provided with a closure member 55 which is preferably under manual control of the user through the lever 57 extending up through, or at least be operable from the floor surface.

Following the teachings of this application, it should be well within the capacity of the average worker in this field to produce a heating plant that will fully combine the desirable characteristics of radiant heating and hot air heating and make it possible for the occupant of a building to exercise full control over the form of heating he desires at the particular time under consideration.

It is believed that it will be clearly apparent from the above description and the disclosure in the drawings that the invention comprehends a novel construction of a hot air panel and circulatory heating system.

Having thus disclosed the invention, I claim:

1. A hot air radiant heating system for a building, comprising: a concrete floor slab having a series of radiant heating hot air ducts independent of each other between their ends running horizontally under the surface of said slab; a source of hot air connected to one end of said ducts; cold air return duct means directly connected with the other end of said hot air ducts and with said source of hot air for recirculation of air; a series of hot air registers, each having an upper housing positioned adjacent said floor slab in position to exhaust into the building and having an air scoop housing depending from said upper housing and positioned in said floor slab above and communicating with one of said hot air ducts intermediate the ends thereof; an air scoop blade for each register and supporting means for each air scoop blade positioning the air scoop blade at the area of joinder of the associated scoop housing with the associated hot air duct and said supporting means supporting the air scoop blade in position to pivot from a position closing the associated scoop housing blocking flow of air therethrough to a position blocking flow of air past the hot air duct associated with the scoop housing and directing air from the hot air duct through said register and into said building.

2. The subject matter of claim 1 in which there is a damper in said cold air return duct means adjustable to limit the flow of air therethrough and in which there are cold air register means connecting the interior of said building with said cold air return duct means.

3. A hot air radiant heating system for a residence building, comprising: said residence building having a plurality of living rooms at one end and having a plurality of bedrooms at the opposite end; said building having a concrete floor slab; a source of hot air; a series of at least four hot air ducts independent of each other between their ends running horizontally under the surface of said slab in a direction from the living rooms end to the bedrooms end of said building and said source of hot air being connected to the living rooms end of said hot air ducts; cold air return duct means directly connected with the bedrooms end of said hot air ducts and with said source of hot air for recirculation and reheating of air; a series of hot air registers including a plurality of registers positioned in and communicating with living rooms and a plurality of registers positioned in and communicating with bedrooms, each register being connected to one of said hot air ducts intermediate the ends of the duct at the location of the associated room to exhaust air into the room for convection heating, each register having air scoop damper means manually operable to move from a first position blocking flow of air through the register to a second position blocking flow of air through the associated hot air duct past the register and directing the air from the duct into the register to exhaust into the building and cold air register means connecting the interior of said building with said source of heated air for recirculating and reheating of air.

References Cited in the file of this patent

UNITED STATES PATENTS

| | | |
|---|---|---|
| 2,001,801 | Smith, Jr. | May 21, 1935 |
| 2,195,691 | Burt | Apr. 2, 1940 |
| 2,364,265 | Brickham | Dec. 5, 1944 |
| 2,465,184 | Alderman | Mar. 22, 1949 |
| 2,523,807 | Borgehesan | Sept. 26, 1950 |
| 2,559,198 | Ogden | July 3, 1951 |
| 2,593,424 | Edgerly | Apr. 22, 1952 |
| 2,603,140 | Kehm | July 15, 1952 |
| 2,619,288 | Shade | Nov. 25, 1952 |
| 2,621,027 | Tatsch | Dec. 9, 1952 |
| 2,629,309 | Lahti | Feb. 24, 1953 |